Nov. 19, 1963   D. P. NADEAU   3,111,339
VEHICLE DOOR LOCK
Filed Sept. 15, 1960   2 Sheets-Sheet 2
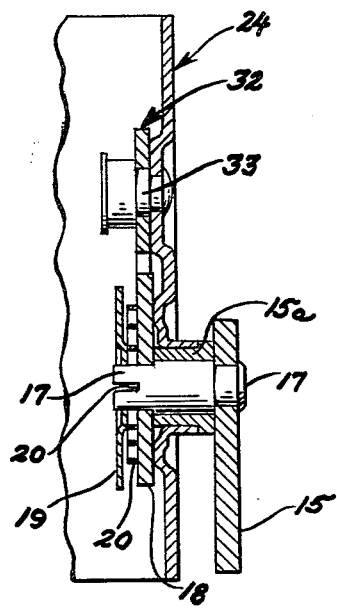
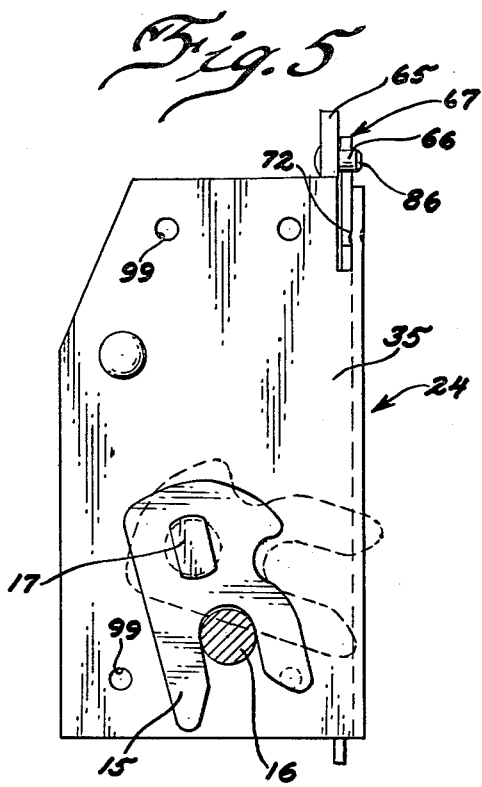
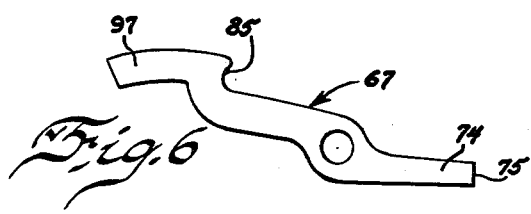
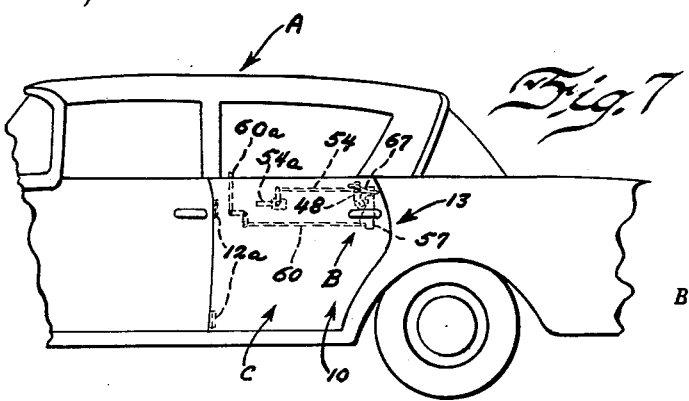
INVENTOR.
DONALD P. NADEAU
BY
*Carl J. Barbee*
ATTORNEY

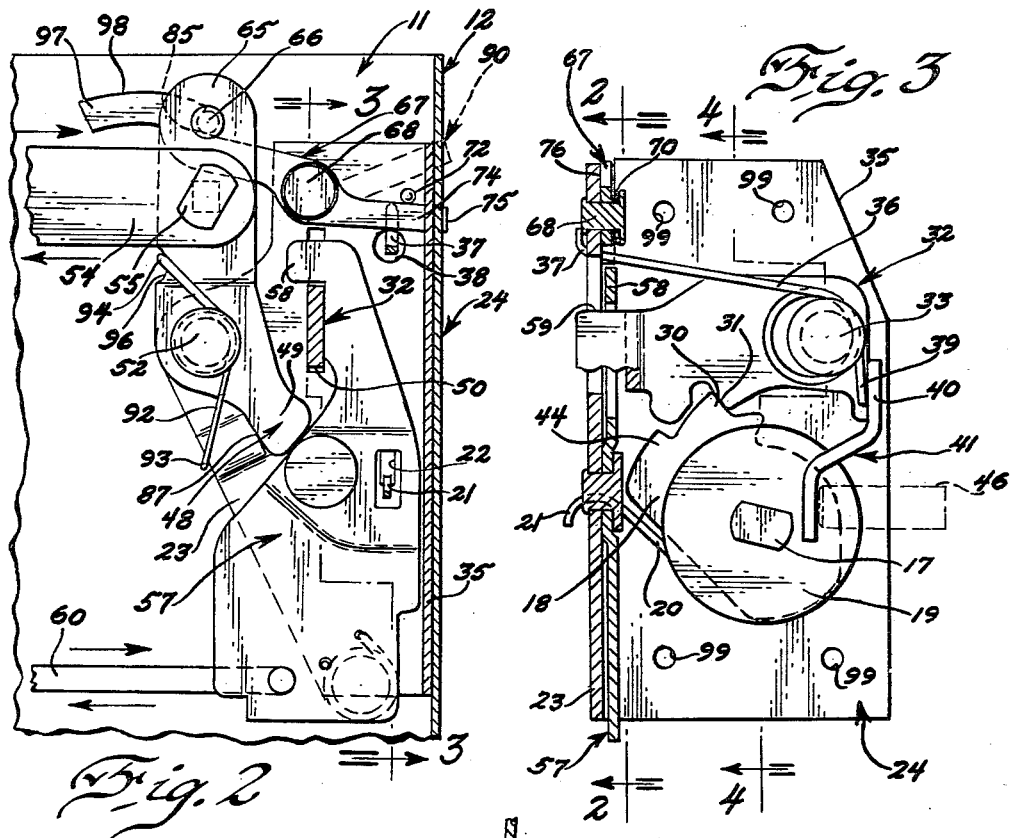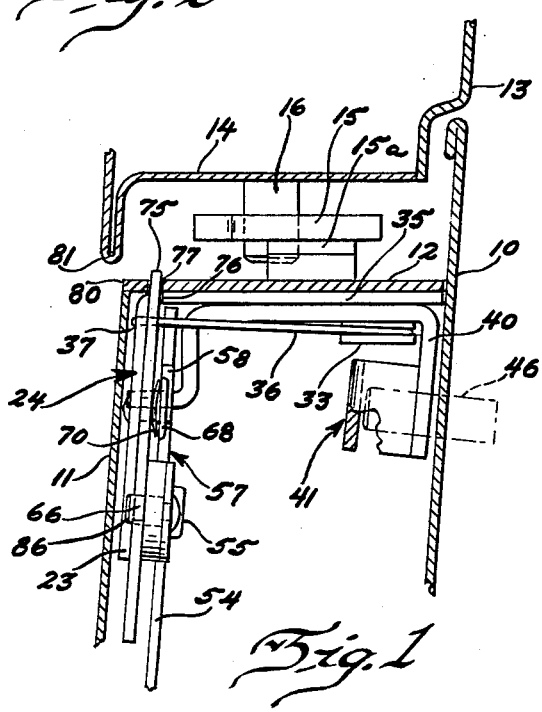

3,111,339
VEHICLE DOOR LOCK
Donald P. Nadeau, Livonia, Mich., assignor to American Motors Corporation, Kenosha, Wis., a corporation of Maryland
Filed Sept. 15, 1960, Ser. No. 56,243
4 Claims. (Cl. 292—216)

The invention relates to a safety lock for an automotive vehicle. It has particular reference to a safety locking feature incorporated into an otherwise conventional locking system with a minimum of revision. The locking mechanism is primarily intended for the rear doors of a vehicle, however, it would be equally useful, if desired, on any other door of such vehicle.

The principal object of the invention then is to incorporate a safety lock mechanism into an otherwise conventional locking system.

Another object is to provide in a safety locking mechanism a latching device for immobilizing a portion of the conventional locking mechanism whereby the door cannot be opened from the interior or passenger compartment of the vehicle. Such safety locking mechanism, however, permits overcoming of such immobilization from the exterior of the vehicle.

Another object is to provide in connection with a vehicle door locking mechanism a latch arm which is operable only from the end wall of the door and prior to door closing.

Other objects and advantages of the invention will be apparent from the ensuing specification and appended drawings in which:

FIG. 1 is a plan view of the locking apparatus mounted in appropriate position with reference to a vehicle door and adjacent pillar.

FIG. 2 is a sectional view taken on the line 2—2 of FIG. 3 with fragments of the door panels included.

FIG. 3 is a sectional view taken on the line 3—3 of FIG. 2 with the lock shown in unlocked position as compared to FIG. 2 and with the door panels omitted.

FIG. 4 is a fragmentary sectional view taken on the line 4—4 of FIG. 3 and with the components shown in FIG. 2 removed.

FIG. 5 is an end view of the locking mechanism as it appears before being mounted on the vehicle door.

FIG. 6 is a detail view of the latching arm.

FIG. 7 is a side view of a portion of a typical vehicle with the locking system shown generally schematically.

Referring to FIG. 7 I have shown a portion of an automotive vehicle A of the four door type wherein the locking system B is shown generally schematically mounted in the rear door C.

Viewing FIG. 1 the door includes an exterior panel 10 spaced from an exterior panel 11—such panels being interconnected by the end wall 12. The exterior panel 11 is in the passenger compartment of the vehicle. The door pillar includes outer panel 13 and an end wall 14 exposed toward the end wall 12 of the door. The door is locked with reference to the door pillar by means of an exterior locking catch 15 engaging a stud or locking element 16 which is anchored to the end wall of the door pillar. When the exterior locking catch is in the position as shown in solid lines in FIG. 5 and is then immobilized, the door is locked with reference to the pillar. By releasing the exterior locking catch 15 to permit its rotation about the axis of the pin 17, to which it is secured, the unlocking and opening of the door can be accomplished by simply swinging it outwardly on its hinges 12a. As the door is opened the exterior locking catch 15 swings about its axis to the position shown generally in dotted lines in FIG. 5.

The exterior locking catch 15 is anchored to the pin 17 which projects through a bearing 15a in the door end wall. The interior locking catch 18 is anchored to the inner end of the pin. A washer 19 is anchored to the end of pin 17 forming in conjunction with the pin a drum about which the torsion spring 20 is wound. The spring has one end 21 projecting through an opening 22 in the side wall 23 of the generally L-shaped supporting bracket which is identified generally by the numeral 24. The other end of the spring is secured to the pin 17. The spring continuously urges the interior locking catch 18 in door unlocking direction wherein, viewing FIG. 3, the interior locking catch would be rotated clockwise. The immobilizing of the interior locking catch 18 is effected by means of the tooth 30 engaging tooth 31 on the trip locking lever identified generally by the numeral 32. Interior lever 32 is rotatably mounted on a pin 33 which is secured to the end wall 35 of bracket 24. A torsion spring 36 has one end 37 extending through opening 38 of the bracket wall and the other end 39 bearing against the upper end 40 of the trigger portion 41 of trip lever 32.

By swinging the trip lever 32 clockwise (viewing FIG. 3) about the axis of pin 33, the tooth 31 is moved upwardly out of the path of teeth 30 and 44 permitting rotation of the locking catches 18 and 15 under the inducement of spring 20. I have shown schematically in FIGS. 1 and 3 a manual button 46 for actuating the trigger 41 for door opening purposes. The button would, of course, be accessible from the exterior of the vehicle.

In order to open the door from inside of the vehicle, the trip lever 32 is lifted by actuating the actuating lever 48 to bring the tongue 49 into engagement with the underneath edge 50. The actuating lever 48 is rotatably mounted on the pin 52 which is secured to the bracket wall 23. Actuation of the actuating lever 48 is accomplished through a link 54 which is pivotally connected to actuating lever 48 by means of the pin 55. The link 54 leads to a suitable actuating handle 54a which is available within the passenger compartment of the vehicle. Viewing FIG. 2, by manually pulling link 54 to the left, the actuating lever 48 is swung about the axis of pin 52 causing the tongue 49 to lift the trip lever 32 for releasing the exterior and interior locking catches.

The trip lever 32 can be immobilized for preventing door opening from either the inside or the outside of the vehicle and this is accomplshed by means of the locking lever 57. The locking lever has a tongue portion 58 which overhangs the upper edge 59 of lever 32 to prevent said trip lever being moved upwardly. When the locking lever 57 is in locking position as shown in FIG. 2, the trip lever 32 cannot be moved upwardly either by actuating the trigger 41 or by bringing the lever tongue 49 into engagement therewith. The locking lever 57 is actuated by means of a link 60 which is moved to the right, viewing FIG. 2, when effecting the locking position of FIG. 2. The link 60 leads to a remote actuating button 60a which is accessible to any occupant of the passenger compartment of the vehicle whether the rear door is closed or opened.

All of the foregoing mechanism is conventional in a door locking system which does not incorporate the safety locking feature of the invention.

The safety locking feature functions by means of immobilizing the actuating lever 48 to prevent actuation of trip lever 32 from the inside of the vehicle but permitting actuation of trip lever 32 from the outside of the vehicle.

The actuating lever 48 has an upwardly projecting extension 65 and a pin 66 is anchored thereto and projects outwardly therefrom. A latch arm identified generally by the numeral 67 is pivotally mounted to the bracket side wall 23 on pin 68. A spring washer 70 is mounted on the shank of pin 68 and exerts lateral tension on the arm 67. The bracket side wall 23 is indented to provide a slight projection 72 in the path of the outer end 74 of the latch arm. The outermost end 75 of such arm projects through a slot 76 in the support bracket and a slot 77 in the door end wall. Thus, the latch arm can only be manually swung about the axis of pivot pin 68 by having access to the end wall of the door (the corner 80 of the door is spaced from the projecting flange portion 81 of the door pillar only sufficiently to prevent interference and not such as to permit manual access to the end of the latch arm either from the interior or the exterior of the vehicle).

The latch arm has a notch 85 formed therein for engagement with the outwardly projecting end portion 86 of the pin 66 whenever the latch arm is swung clockwise (viewing FIG. 2) about the axis of pin 66 to the position as shown in solid lines in FIG. 2. In this position the actuating lever 48 is prevented from moving counterclockwise about the axis of pin 52 because of the engagement of the notch portion of the latch arm with pin 66 and is prevented from moving in clockwise direction because of the engagement of the tongue portion 49 with the lug 87 formed in the bracket side wall 23. With the latch arm in the position shown in FIG. 2 the actuating lever 48 is immobilized insofar as serving to lift trip lever 32, however, the latter trip lever can be lifted by actuating trigger 41 from the exterior of the vehicle (it will be understood that the lever 57 is in unlocked position, that is, it is swung clockwise, viewing FIG. 2, until the overhanging tongue portion 58 is clear of the trip lever 32). Thus, when the actuating lever 48 is immobilized by means of the latch arm 67, such immobilization cannot be released by the occupant of the rear seat of the vehicle and the door remains locked at all times until opened from the outside of the vehicle. The lateral tension exerted on the latch arm by the spring washer 70 in conjunction with the projection 72 serves to prevent accidental unlatching of the latch arm such as might be caused by vibration of the vehicle during movement thereof. Likewise, when the latch arm is in unlatched position as indicated in solid lines in FIG. 3 and by dotted lines at 90 in FIG. 2, the projection 72 will tend to prevent accidental latching of the latch arm as a result of vehicle vibration.

It will be understood that in order to put the safety lock in operation, it is first necessary to open the door C thereby exposing the end wall 12 to gain access to the end 75 of the latch arm. The latch arm end 75 is then pushed downwardly until notch 85 engages pin 66. Then the door can be closed and the safety lock feature is in operation.

A torsion spring 92 has one end 93 engaging the bracket side wall 23 and its other end 94 engaging the actuating lever 48 at the notched area 96 thereby continuously urging the actuating lever in clockwise direction, viewing FIG. 2, until the tongue 49 engages lug 87. Thus, the pin 66 will always be in proper position to permit engagement of the notched portion 85 of the latch arm therewith whenever such arm is manually pushed downwardly at the end 75. It will be understood that the tail portion 97 of the latch arm is not accessible for actuation of the latch arm but, rather, is provided for the purpose of assuring against any accidental latching during manual operation of link 54. That is, the tail portion is provided with an arcuate upper surface 98 which can ride along the underside of pin 66 during any actuation of actuating lever 48 by means of the link 54.

It will be noted in viewing FIGS. 3, 4 and 5 that the locking apparatus is shown without including any details of the door panels or door pillar structure. The apertures 99 are available for anchoring the support bracket 24 to the end wall 12 of the door.

I claim:

1. A locking device for locking a door stationary relative to its frame, wherein the door has an end wall spaced from and exposed toward an end wall of the frame and wherein the door has interior and exterior walls spaced from each other and joining with the door end wall, said device comprising: a locking element secured to the end wall of the frame; an exterior locking catch movably carried by the door end wall exteriorly thereof for engagement with the locking element on the frame end wall; an interior locking catch positioned interiorly of the door near the end wall thereof and movable along with the movement of the exterior locking catch; a supporting bracket having an end wall and a side wall and secured to the door with its end wall adjacent the end wall of the door; a trip lever carried on the supporting bracket for coacting with the interior locking catch; an actuating lever carried on the supporting bracket and serving to engage the trip lever to effect a releasing of the locking catches to render same movable for door unlocking purposes; a door handle carried by the door on its interior wall remotely from the supporting bracket; means carried by the exterior wall of the door adjacent to the supporting bracket for actuating the trip lever independently of the actuating lever for effecting a release of the locking catches for door unlocking purposes; a link interconnecting the actuating lever and the door handle, whereby actuation of the trip lever is effected by actuating the door handle; means carried on the supporting bracket for immobilizing the actuating lever to prevent door unlocking by means of the door handle, said means comprising: a latch arm pivotally carried on the side wall of the bracket and having a first end on one side of the pivot projecting through the end wall of the bracket and through the end wall of the door and a second end on the other side of the pivot and releasably engaged with the actuating lever, said arm being adapted for swinging movement by manual manipulation of the first end of the arm, whereby to effect engagement or disengagement of the second end of the arm with the actuating lever.

2. A locking device for locking a door stationary relative to its frame, wherein the door has an end wall spaced from and exposed toward an end wall of the frame and wherein the door has interior and exterior walls spaced from each other and joining with the door end wall, said device comprising: a locking element secured to the end wall of the frame; an exterior locking catch movably carried by the door end wall exteriorly thereof for engagement with the locking element on the frame end wall; an interior locking catch positioned interiorly of the door near the end wall thereof and movable along with the movement of the exterior locking catch; a supporting bracket having an end wall and a side wall and secured to the door with its end wall adjacent the end wall of the door; a trip lever carried on the supporting bracket for coacting with the interior locking catch; an actuating lever carried on the supporting bracket and serving to engage the trip lever to effect a releasing of the locking catches to render same movable for door unlocking purposes; a door handle carried by the door on its interior wall remotely from the supporting bracket; means carried by the exterior wall of the door adjacent to the supporting bracket for actuating the trip lever independently of the actuating lever for effecting a release of the locking catches for door unlocking purposes; a link interconnecting the actuating lever and the door handle, whereby actuation of the trip lever is effected by actuating the door handle; means carried on the supporting bracket for immobilizing the actuating lever to prevent door unlocking by means of the door handle, said means comprising: a latch arm pivotally carried on the side wall of the bracket and having a first end on one side of the pivot projecting through the end wall of the bracket and through the end wall of the door and a second end on the other side of the pivot and releasably engaged with the actuating lever, said arm being adapted for swinging movement by manual manipulation of the first end of the arm, whereby to effect engagement or disengagement of the second end of the arm with the actuating lever; a spring mounted on the arm pivot for exerting lateral tension on the arm relative to the side wall of the bracket and means provided on the side wall of the bracket and situated in the path of travel of the arm for hindering swinging movement of the arm.

3. A locking device for locking a door stationary relative to its frame, wherein the door has an end wall spaced from and exposed toward an end wall of the frame and wherein the door has interior and exterior walls spaced from each other and joining with the door end wall, said device comprising: a locking element secured to the end wall of the frame; an exterior locking catch movably carried by the door end wall exteriorly thereof for engagement with the locking element on the frame end wall; an interior locking catch positioned interiorly of the door near the end wall thereof and movable along with the movement of the exterior locking catch; a supporting bracket having an end wall and a side wall and secured to the door with its end wall adjacent the end wall of the door; a trip lever carried on the supporting bracket for coacting with the interior locking catch; an actuating lever carried on the supporting bracket and serving to engage the trip lever to effect a releasing of the locking catches to render same movable for door unlocking purposes; a door handle carried by the door on its interior wall remotely from the supporting bracket; means carried by the exterior wall of the door adjacent to the supporting bracket for actuating the trip lever independently of the actuating lever for effecting a release of the locking catches for door unlocking purposes; a link interconnecting the actuating lever and the door handle, whereby actuation of the trip lever is effected by actuating the door handle; means carried on the supporting bracket for immobilizing the actuating lever to prevent door unlocking by means of the door handle, said means comprising: a latch arm pivotally carried on the side wall of the bracket and having a first end on one side of the pivot projecting through the end wall of the bracket and through the end wall of the door and a second end on the other side of the pivot and releasably engaged with the actuating lever, said arm being adapted for swinging movement by manual manipulation of the first end of the arm, whereby to effect engagement or disengagement of the second end of the arm with the actuating lever; a pin secured to the actuating lever and projecting outwardly from one face thereof into the path of travel of the arm and said arm having a notch therein for co-action with the pin for immobilizing the actuating lever.

4. A locking device for locking a door stationary relative to its frame, wherein the door has an end wall spaced from and exposed toward an end wall of the frame and wherein the door has interior and exterior walls spaced from each other and joining with the door end wall, said device comprising: a locking element secured to the end wall of the frame; an exterior locking catch movably carried by the door end wall exteriorly thereof for engagement with the locking element on the frame end wall; an interior locking catch positioned interiorly of the door near the end wall thereof and movable along with the movement of the exterior locking catch; a supporting bracket having an end wall and a side wall and secured to the door with its end wall adjacent the end wall of the door; a trip lever carried on the supporting bracket for coacting with the interior locking catch; an actuating lever carried on the supporting bracket and serving to engage the trip lever to effect a releasing of the locking catches to render same movable for door unlocking purposes; a door handle carried by the door on its interior wall remotely from the supporting bracket; means carried by the exterior wall of the door adjacent to the supporting bracket for actuating the trip lever independently of the actuating lever for effecting a release of the locking catches for door unlocking purposes; a link interconnecting the actuating lever and the door handle, whereby actuation of the trip lever is effected by actuating the door handle; means carried on the supporting bracket for immobilizing the actuating lever to prevent door unlocking by means of the door handle, said means comprising: a latch arm pivotally carried on the side wall of the bracket and having a first end on one side of the pivot projecting through the end wall of the bracket and through the end wall of the door and a second end on the other side of the pivot and releasably engaged with the actuating lever, said arm being adapted for swinging movement by manual manipulation of the first end of the arm, whereby to effect engagement or disengagement of the second end of the arm with the actuating lever; a pin secured to the actuating lever and projecting outwardly from one face thereof into the path of travel of the arm and said arm having a notch therein for co-action with the pin for immobilizing the actuating lever, the arm having a curved tail portion at the end where the notch is situated, to lessen the possibility of unintentional immobilization of the actuating lever.

References Cited in the file of this patent

UNITED STATES PATENTS

| | | |
|---|---|---|
| 1,061,283 | Griffin | May 13, 1913 |
| 2,026,389 | Johnson et al. | Dec. 31, 1935 |
| 2,694,591 | Amschuetz | Nov. 16, 1954 |
| 3,065,013 | Pickles | Nov. 20, 1962 |